(12) United States Patent
Bigham et al.

(10) Patent No.: US 7,570,956 B2
(45) Date of Patent: Aug. 4, 2009

(54) INTELLIGENT CONTROL OF RADIO RESOURCES IN A WIRELESS NETWORK

(75) Inventors: John Bigham, Surbiton (GB); Clive Parini, Essex (GB); Laurie Cuthbert, Essex (GB)

(73) Assignee: Queen Mary & Westfield College, London (GB)

( * ) Notice: Subject to any disclaimer, the term of this patent is extended or adjusted under 35 U.S.C. 154(b) by 1144 days.

(21) Appl. No.: 10/257,665

(22) PCT Filed: Apr. 12, 2001

(86) PCT No.: PCT/GB01/01673

§ 371 (c)(1),
(2), (4) Date: Mar. 21, 2003

(87) PCT Pub. No.: WO01/78434

PCT Pub. Date: Oct. 18, 2001

(65) Prior Publication Data

US 2004/0043764 A1    Mar. 4, 2004

(30) Foreign Application Priority Data

Apr. 12, 2000   (GB) .................................. 0009018.3

(51) Int. Cl.
*H04W 72/00*   (2009.01)
*H04W 40/00*   (2009.01)

(52) U.S. Cl. ..................................... 455/453; 455/446

(58) Field of Classification Search .............. 455/422.1, 455/424, 453, 456.5, 524, 63.1, 561, 562.1, 455/418, 446

See application file for complete search history.

(56) References Cited

U.S. PATENT DOCUMENTS

| | | | | |
|---|---|---|---|---|
| 5,276,907 A | * | 1/1994 | Meidan | 455/436 |
| 5,428,817 A | | 6/1995 | Yahagi | |
| 5,504,937 A | * | 4/1996 | Kangas | 455/453 |
| 5,638,494 A | | 6/1997 | Pinard et al. | |
| 5,805,996 A | * | 9/1998 | Salmela | 455/453 |
| 6,112,081 A | * | 8/2000 | Namura et al. | 455/424 |
| 6,151,310 A | * | 11/2000 | Dent | 370/330 |
| 6,188,913 B1 | * | 2/2001 | Fukagawa et al. | 455/562.1 |
| 6,219,541 B1 | * | 4/2001 | Brodie | 455/451 |
| 6,236,866 B1 | * | 5/2001 | Meyer et al. | 455/562.1 |
| 6,266,537 B1 | * | 7/2001 | Kashitani et al. | 455/522 |
| 6,356,760 B1 | * | 3/2002 | Suzuki | 455/453 |
| 6,631,125 B1 | * | 10/2003 | Longoni et al. | 370/341 |
| 6,650,900 B1 | * | 11/2003 | Chavez et al. | 455/446 |

FOREIGN PATENT DOCUMENTS

EP    0 615 395    9/1994

(Continued)

*Primary Examiner*—George Eng
*Assistant Examiner*—Nam Huynh
(74) *Attorney, Agent, or Firm*—Young & Thompson

(57) ABSTRACT

A method of controlling radio resources in a cellular wireless network comprising a plurality of fixed antennas providing overlapping radio coverage, the method comprising dynamically adjusting the radiation patterns of the antennas using coordinated distributed control to optimize capacity. The wireless network may be a cellular mobile network or part thereof comprising a plurality of cells, each cell having a base station comprising an antenna, and the method may then further comprise determining the concentration of mobile stations in each cell and changing the radiation/reception pattern of the antennas of some or all of the base stations in response to the concentration of mobile stations in each cell.

17 Claims, 4 Drawing Sheets

FOREIGN PATENT DOCUMENTS

| | | |
|---|---|---|
| GB | 2 299 916 | 10/1996 |
| GB | 2 311 191 | 8/1997 |
| GB | 2 318 483 | 4/1998 |
| WO | 93/12587 | 6/1993 |
| WO | WO 97 08909 | 3/1997 |
| WO | WO 99 60659 | 11/1999 |

* cited by examiner

INTELLIGENT CONTROL OF RADIO RESOURCES IN A WIRELESS NETWORK

The invention relates to the intelligent control of radio resources in a wireless network, and in particular but not exclusively to the control of resources in a cellular mobile telephone network.

In mobile cellular telephone networks subscribers are dynamically allocated channels from a pool of available channels. Techniques for increasing the efficiency of channel usage in mobile networks are essential in order to handle the complexity of third generation mobile communications. Previous work on analogue and second generation mobile communications has led to several algorithms being proposed to optimise channel usage and minimise call blocking probability. Some channel assignment schemes presented in the literature have improved the performance of the basic fixed channel assignment strategy for different traffic densities (macro/micro/pico cellular networks) over different traffic load conditions. However, most of the solutions proposed have an entirely reactive approach: the response to a series of events follows an algorithm that is prepared to react to specific situations. This limits their efficiency. Even those schemes that contain adaptive features are not ideal. Some schemes are completely centralised (which is impractical for real implementation because of computational complexity making them too slow, or because the network would become overloaded with signalling messages) or are distributed, but restricted to individual base stations which again limits their efficiency.

The mechanism known as Fixed Channel Assignment (FCA) is too limiting for mobile networks and several strategies have been proposed to maximise frequency channel allocation and minimise call blocking probability. A detailed survey describing dynamic channel allocation (DCA) schemes and FCA-based schemes, including those with channel borrowing, is given in M. Zhang and T.-S. P. Yum, "Comparisons of Channel Assignment Strategies in Cellular Mobile Telephone Systems", IEEE Trans. on Vehicular Technology, vol. 38, no. 4, November 1989, and H. Jiang and S. S. Rappaport, "CBWL: A new channel assignment and sharing method for cellular communication systems", IEEE Trans. on Vehicular Technology, vol. 43, no. 2, May 1994. In these papers it is noted that there is a trade-off between the implementation complexity of the channel allocation algorithms and spectrum utilisation efficiency. DCA schemes perform better under low traffic intensity; modified FCA schemes have superior performance in high traffic loads. DCA schemes use channels more efficiently and for the same blocking rate have a lower forced call termination than FCA-based schemes. However, the near-optimum channel allocation is at the expense of high signalling overheads through its use of centralised allocation schemes. This overhead means that such schemes are not practicable for large networks.

Distributed DCA schemes with limited inter-cell communication suffer less overhead, but lead to sub-optimum allocations. Such schemes are being proposed for microcellular systems as this cell structure allows inter-cell information sharing by interference measurements and passive non-intrusive monitoring at each base station (busy/idle status of the carriers).

For macrocellular systems, where explicit communication is needed, FCA with channel borrowing offers good results and less computational complexity than DCA. However, those FCA schemes with the best results used centralised control inside the Mobile Switching Centre (MSC). Although that is less complex than DCA schemes, there is still a need to maintain an up-to-date global knowledge of the entire mobile network, leading to a slow response and a heavy signalling load. To alleviate this problem, several authors have proposed modifications to make the schemes more distributed. One example is D-LBSB that performs better than its centralised version and also outperforms other existing schemes like direct retry and CBWL. D-LBSB is a distributed FCA algorithm with selective borrowing, channel locking and channel reassignment. It takes into consideration the position of the mobile users when borrowing and re-assigning channels; it triggers the execution of the algorithm when the usage of the nominal channels in a cell reaches a pre-determined threshold (h, when a previously cold cell becomes hot). It also controls the number of the channels to be borrowed from or lent to a cell according to the traffic load of the whole cellular network.

According to a first aspect of the present invention, there is provided a method of controlling radio resources in a cellular wireless network comprising a plurality of fixed antennas providing overlapping radio coverage, the method comprising dynamically adjusting the radiation patterns of the antennas using distributed co-operative control.

Typically, the dynamic adjustment of the radiation patterns is carried out in order to satisfy varying demand patterns from wireless terminals. The adjustment can therefore maintain overall coverage and equalise the load across the cells.

The use of distributed co-operative control allows the radiation patterns of antennas to be adjusted quickly and efficiently in response to variations in demand across the network without the intervention of a central control system. The radiation patterns are preferably adjusted in response to negotiations between base stations.

The invention can be applied to any wireless network, but in preferred embodiments the wireless network is a cellular mobile network or part thereof comprising a plurality of cells, each cell having a base station comprising one or more antennas, and the method comprises determining the concentration of mobile stations in each cell and changing the radiation/reception pattern of the antennas of some or all of the base stations in a co-ordinated way in response to the concentration of mobile stations in each cell. The wireless network may also, for example, be a fixed wireless access network.

Preferably agent technology is used to co-ordinate this distributed control of the radiation pattern of the antennas, and in preferred embodiments the agent technology is used to control the antennas to dynamically optimise the radio coverage of the network to maximise the capacity of the network. The agent technology may also be used to control frequency channel assignment and handovers between cells.

The agent technology preferably uses agents comprising a control unit, the control unit comprising a reactive layer for managing radio coverage within a cell and one or more planning layers for optimising radio coverage within one or more cells in response to local changes.

According to a second aspect of the present invention, there is provided a method of controlling radio resources in a cellular wireless network comprising a plurality of fixed antennas providing overlapping radio coverage, the method comprising using artificial intelligence techniques to control the radiation patterns of the antennas.

According to a third aspect of the present invention, there is provided a method of controlling a cellular wireless network comprising base stations, each base station comprising an antenna having a dynamically variable radiation pattern (smart antenna), the method comprising co-ordinating the radiation patterns of the antennas across base stations.

According to a fourth aspect of the present invention, there is provided a method of optimising the allocation of radio resources in a mobile telephone network, comprising tracking changes in demand by mobile subscribers and co-ordinating the radiation patterns of smart antennas at base stations in the network.

According to a fifth aspect of the present invention, there is provided a method of co-ordinating the radiation patterns of smart antennas within a wireless network, comprising using hybrid agent architecture to support negotiation between base stations within the network.

According to a sixth aspect of the present invention, there is provided a wireless network comprising base stations having smart antennas, wherein the radiation patterns of the smart antennas are dynamically adaptable in a co-ordinated way to meet variations in demand within the wireless network.

Thus in preferred embodiments of the invention, the agent technology approach is used not only to control channel assignment and handovers between cells, but also to control the smart antennas to dynamically optimise the radio coverage of a group of cells to maximise the capacity as required. This can be used in addition to the other mechanisms.

The invention may also be used in fixed wireless access (wireless in the local loop) to manage capacity on demand. This is similar in concept to cellular mobile systems, but the wireless terminals do not move.

In order to accommodate multiple networks and services with multiple bit rates within a limited frequency band, resource flexibility is one of the most important requirements in third-generation networks. A distributed control system, and in particular a multi-agent system, is able to provide this flexibility and is also able to increase the robustness of the network by allowing negotiation when conflicts occur. Such negotiation produces antenna pattern control that can enable a failure of a single cell to be covered by adjacent cells, who themselves have some of their capacity off loaded to cells in a second ring surrounding the failed cell by agent control of their antenna patterns. Such negotiation will also allow a new cell to advertise its existence and be seamlessly added to the network without manual network reconfiguration. This concept can be used to provide temporary increase in network capacity via a portable base station to cover large predictable increases in network demand, such as would be required at a large sporting event.

A Multi-Agent System (MAS) can be defined as a group of agents with specific roles in an organisational structure. The agents interact with the environment and with each other in a co-ordinated way, as collaborators or competitors, seeking to fulfil the local or global aims of the organisation. The definition of an agent and the main characteristics that distinguish agents from other software systems can de found in J. P. Müller, "The Design of Intelligent Agents: A layered Approach", Lecture Notes in Artificial Intelligence 1177, Sub-series of Lecture Notes in Computer Science, Edited by J. Carbonnel and J. Siekmann, Springer, 1996. Agent architectures are classified by the degree of reasoning incorporated by the agent, from a completely logical model (known as Beliefs, Desires, Intentions (BDI) architectures) to a fully reactive model with no symbolic representation.

Recent research has shown that reactive approaches, while necessary, are not sufficient for efficient control of resources: the base stations should have an adaptive behaviour, not only to improve their own channel usage, but also to co-operate with other base stations to improve the performance of the whole network. The inherent features of distributed problem solving make a multi-agent system a suitable approach to control such a complex system.

Logical models present better behaviour than reactive ones, but they can be too slow for real time applications. Hybrid architectures combine features of logical and reactive models and are, therefore, more suitable for real time applications. INTERRAP is a well-known hybrid agent architecture that also incorporates mechanisms for co-ordination and co-operation among autonomous agents. The INTERRAP architecture consists of a set of hierarchical layers, a knowledge base that supports the representation of different abstraction levels of knowledge and a well defined control architecture that ensures coherent interaction among layers. It was designed to react to unexpected events, to long term actions based on goals and to cope with other agent interactions. The control unit is structured to include a reactive control layer that is responsible for fast accommodation of traffic demand, a local planning control layer using other strategies to optimise the local load distribution of channels and the co-operative control layer, responsible for load balancing across a larger area by initiating handovers to move the allocation of mobile terminals to cells.

Some preferred embodiments of the invention will now be described by way of example only and with reference to the accompanying drawings in which.

Figure 1:
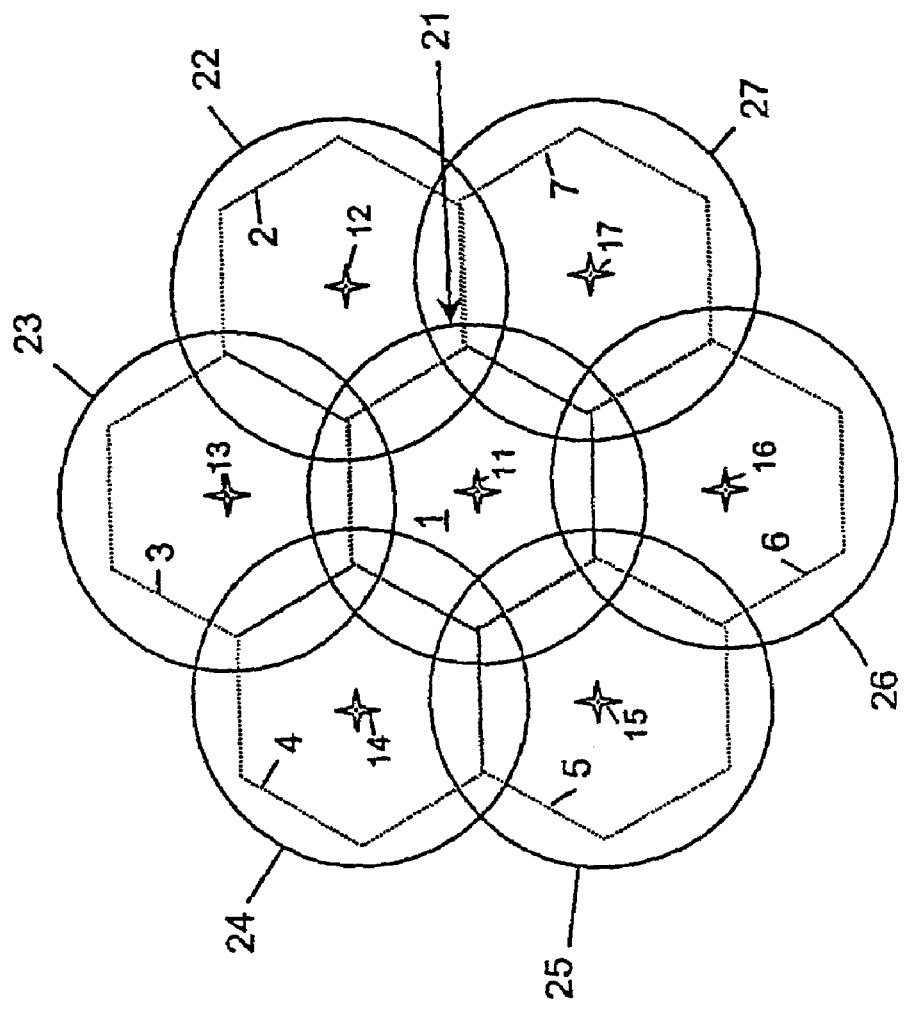
FIG. 1 is a schematic representation of the hexagonal cell pattern of a typical mobile phone network, showing the coverage provided by each antenna.

FIG. 1 shows schematically the hexagonal cell pattern of a typical idealised mobile telephone network. In this figure, seven cells 1-7 are shown. Each cell has a base station 11-17 at its centre. The radio coverage footprint provided by each base station is not exactly hexagonal and is illustrated by the overlapping circles 21-27, although the coverage is not necessarily circular. This is the coverage that has been assumed for previous work on frequency channel assignment and agent technology controlling handover.

Figure 2:
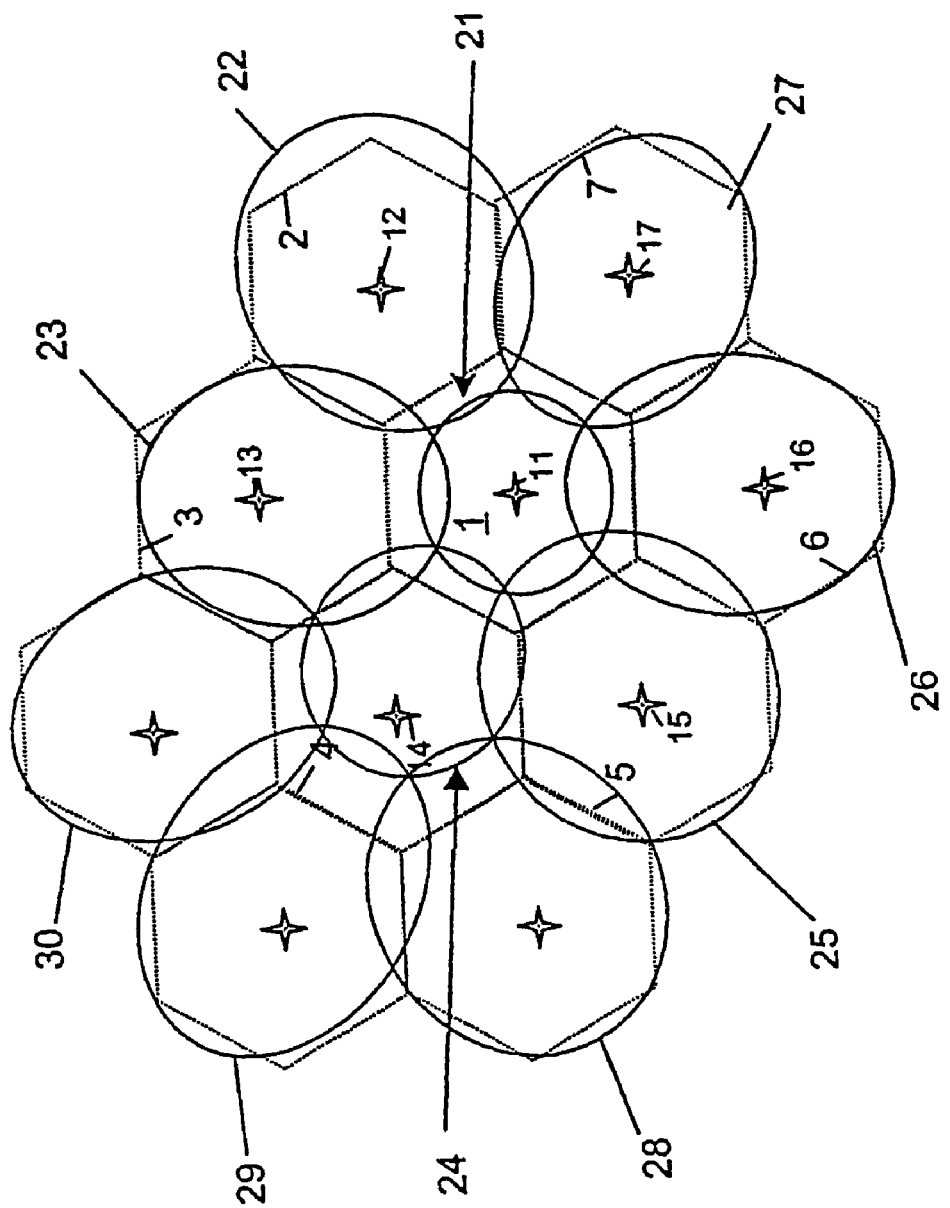
FIG. 2 shows schematically the change in coverage that can be provided by a smart antenna.

If there are a lot of mobile telephone users in cell 1, so that the capacity of cell 1 needs to be increased, the smart antenna 12 in cell 2 is controlled by the agents (see below) to change its coverage pattern 22 to provide more coverage in cell 1, as shown in FIG. 2. This is repeated in smart antennas 13 to 17 whose coverages are commanded to those shown in 23 to 27 thus shrinking the coverage of cell 1 to that of coverage pattern 21 of FIG. 2. It is important to ensure that some coverage is maintained across the whole region covered by the network, so other cells may also need to be modified to prevent "holes". For example, the coverage of cell 14 in FIG. 2 is now incomplete due to its own high traffic load and so revised cell coverage patterns 28 to 30 provide this coverage from cells adjacent to it. For simplicity, this further modification is not fully shown in FIG. 2.

Application of this invention to the GSM system can be done in a low dynamic way where the change in cell coverage can last for minutes and applies to all frequencies and time slots used within a cell or sector. Alternatively it can be applied in a fast dynamic way where calls emanating from several high traffic sources are marshalled (by in cell handovers) into one or more GSM time slots and the cell antenna pattern coverage switches between time slots. The GSM standard allows for up to eight full-rate mobile units to share the same frequency. Digitally encoded samples are transmitted during each time slot of 577 µs duration. A frame of eight time slots repeats every 4.6 ms. Thus the GSM smart antenna system would be able to switch to up to 8 different antenna pattern coverages on the uplink and downlink, maintaining a given pattern for the duration of a time slot.

The invention is also highly applicable to mobile systems operating using Code Division Multiple Access (CDMA) and this embodiment has been used to demonstrate the invention by software simulation of a group of cellular base stations employing agent control.

Purely reactive approaches, while necessary, are not sufficient for efficient control of radio resources through smart antennas in exactly the same way that they were not with channel assignment and handover control. The base stations must have an adaptive behaviour, not only to improve their radio coverage, but also to co-operate with other base stations to improve the performance of the whole network. The inherent features of distributed problem solving make a multi-agent system a suitable approach to control such a complex system.

The agents interact with the environment and with each other in a co-ordinated way, as collaborators or competitors, seeking to fulfil the local or global aims of the organisation.

One embodiment of the invention uses the INTERRAP hybrid agent architecture that also incorporates mechanisms for co-ordination and co-operation among autonomous agents. The INTERRAP architecture consists of a set of hierarchical layers, a knowledge base that supports the representation of different abstraction levels of knowledge and a well defined control architecture that ensures coherent interaction among layers. It was designed to react to unexpected events, to long term actions based on goals and to cope with other agent interactions.

Figure 3:
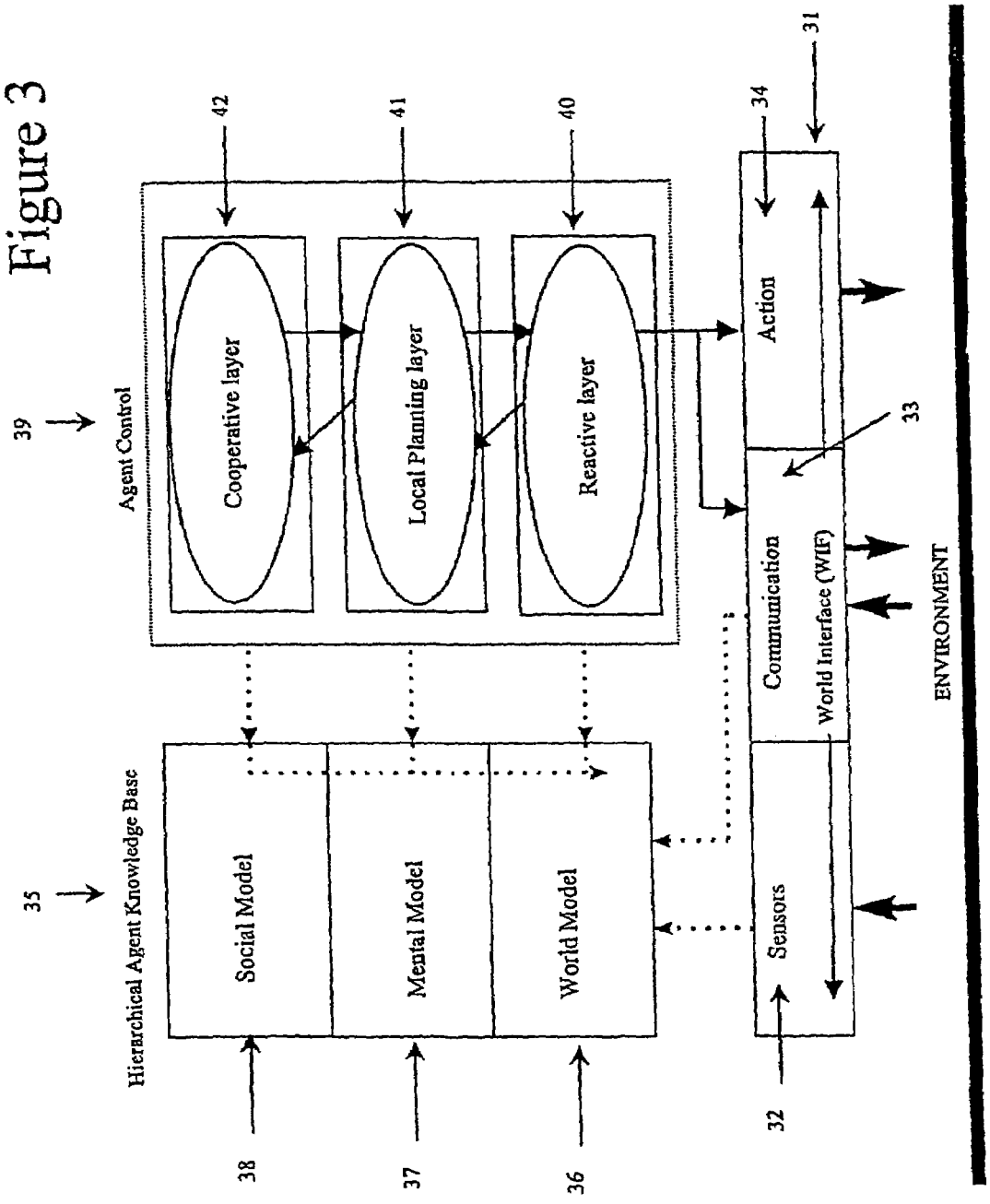
FIG. 3 is a representation of the architecture of an agent.

The architecture of an agent is shown in FIG. 3. In one embodiment, the cellular network has one agent per cell. The world interface 31 presented to the agent includes the sensor section 32 responsible for the perception of the environment, which would include requests for changes in coverage pattern.

The communication section 33 handles message exchanges for radio resource management and in the negotiation process. The action section 34 is responsible for all execution tasks that actually change radio coverage and terminate appropriately unsuccessful requests.

The agent has a knowledge base 35, which contains the world model 36 containing the environment information and everything necessary for the operation of the reactive layer 40. The mental model 37 contains the complete information about the agent, about the radio footprints and possibly history of traffic load in the cell. Finally the social model 38 has relevant information about other agents' data.

The agent further comprises a control unit 39, structured to include a reactive control layer 40 that is responsible for fast accommodation of traffic demand, a local planning control layer 41 using other strategies to optimise the local radio patterns and the co-operative control layer 42, responsible for coverage balancing across a larger area. The agents follow a collaborative strategy using a protocol such as the Contract-Net Protocol. A brief description of each layer implementation is given below.

The reactive layer 40 uses a reactive algorithm to manage the radio coverage within the cell, whether this is static or uses beam switching. It is particularly important to deal with handover requests or with new connections.

The local planning layer 41 considers local changes to optimise coverage within a cell or a cluster of cells. This ensures optimum coverage of radio signal for existing mobiles, subject to the constraint that coverage throughout the cell must be maintained to allow for new connections.

Finally the co-operative layer 42 starts a joint plan when the traffic load of the compact coverage pattern does not allow efficient performance of the local planning scheme. The agent in the hot cell or areas of hot cells, using the contract-net protocol, requests its neighbouring cells or areas to make offers for moving their radio footprint into part of the hot cell region. To be able to make a bid, the adjacent cells need to compute a utility function that requires the load conditions of its compact pattern. Therefore, they request offers of capacity (constrained by terminal distribution) to their adjacent cells. These cells use another utility function to prepare their bids before sending offers. The cells compute the bids and send the offers back to the hot cell, which chooses the best bid and sends an acknowledgement to the winning cell.

A description of the architecture used in a software simulator developed to demonstrate the invention in the context of a CDMA network is now given.

A control mechanism for a CDMA network can be formulated as a multi agent system where the agents represent different roles played by the actors (i.e. the network providers and service providers) in the system. Each agent involved in making decisions at call request time has a multi-layered structure that follows the concept of Bodanese and given in Bodanese, E. L. & Cuthbert, L. G., A Multi-Agent Channel Allocation Scheme for Cellular Mobile Networks, $4^{th}$ International Conference on Multi-Agent Systems (ICMAS 2000), Boston, Mass., USA, Jul. 7-12, 2000. This shares features from well-known architectures such as TouringMachines given in I. A. Ferguson, "TouringMachines: An Architecture for Dynamic, Rational, Mobile Agents." Cambridge, UK: Clare Hall, University of Cambridge, 1992, and INTERRAP. We will describe the architecture as consisting of three layers, called the reactive, local planning and co-operation layers, corresponding to action and decisions being taken on different timescales. There can be more than three layers. This is somewhat similar to the conventional control plane and management plane distinction in telecommunications networks, but one further advantage of agent technology is that the layering can take place within an agent rather than across the network as a whole. Other agents in the overall system may have a different structure. The agent described in this embodiment is termed as the Radio Resource Agent (RRA) and in this description it manages the resources of a network provider within part of the region served by a Radio Network Controller (RNC). A network provider would have many instances of such an agent managing its resources. In summary, in this embodiment:

The co-operative layer 42 of the agent negotiates and then executes a joint plan between RRAs where changing the antenna patterns within the control of one RRA may impinge on the patterns required in a neighbouring area. A subset of the algorithmic aspect of this invention realises this layer.

The local planning layer 41 manages the antenna patterns to maximise the effective use of the network within the control of a particular RRA where they have no impact on other RRAs. One solution aims to minimise the total interference noise resulting from a cluster of mobiles by directing antenna gain in the direction of those clusters with high mobile transmit powers and high cluster populations. This area over which such minimisation occurs can in principle range from one cell to a number of cells managed by the same RRA.

The reactive layer 40 has to make fast decisions on base-station assignment and connection admission control (CAC) in response to connection requests. It does this following the policy imposed by the planning layers.

Considering the reactive and planning function in more detail:—

Figure 4:
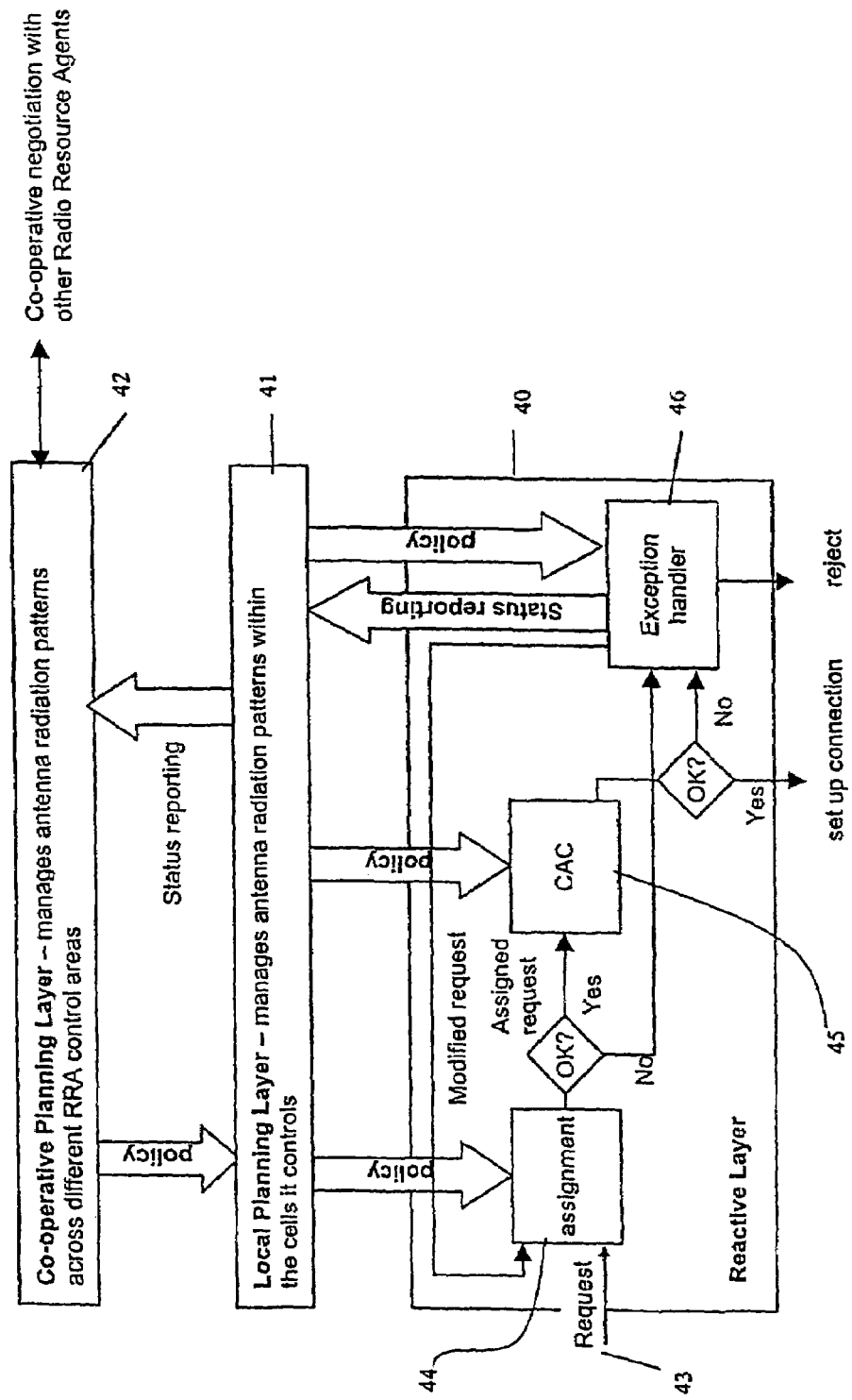
FIG. 4 is a representation of the reactive layer of a particular embodiment of an agent.

Reactive Layer: The reactive layer 40 works at an individual connection request level and performs many of the same functions that would be undertaken in a conventional RNC (assigning the connection to a base station (Node B), and performing Connection Admission Control (CAC)), but rather than use fixed algorithms it does this using context dependent policies created by the planning layer, as shown in FIG. 4.

A connection request 43 is first considered for assignment 44 to a Node B 45 using an algorithm or set of rules passed down (dynamically) from the planning layer. These rules take into account the particular antenna patterns in use at that time. The assigned Node B is the one that is allowed to perform power control, and which subsequently accepts or rejects the call. Standard assignment mechanisms can be passed down as a policy, or proprietary schemes or even new schemes. Since these can be changed dynamically, the planning layer can respond to local resource issues by changing the assignment strategy in line with changing antenna radiation patterns.

This is followed by CAC 45 which operates in a similar way. Should the assignment 44 or CAC 45 fail, an exception management module 46 will check if any local rules can be applied to see if further modified attempts should be made, or whether the failure should be reported to the local planning layer, which monitors how revised antenna patterns might reduce rejection rate.

It can be seen, therefore, that handling of the request is very fast at the reactive layer, but that the planning layer has a lot of flexibility in changing the policy to suit current conditions.

Local Planning Layer:

The local planning layer sets policy for modules in the reactive layer and plans the reconfiguration of the antennas to optimise coverage and makes decisions regarding sets of call requests. It does this within the range of cells under its own control. It works by considering aggregate demand levels, rather than each individual call request. The planning layer monitors the performance of the reactive layer and monitors environmental factors such as demand. These are used to trigger re-planning.

The method need not be just reactive to demand changes. For example, if long or short-term predictions of demand are available then they can be used in constructing optimal plans. The use of predictions will naturally improve the performance of the method, although it is not necessary. An entirely reactive mechanism implicitly uses the forecast that demand stays the same.

An antenna pattern at a Node B or sequence of such patterns over time represents a Node B plan over the chosen planning horizon. One key role of the planning layer is co-ordination of the Node B plans to be generated at the base stations. The aim is to maximise the coverage so as to cater for current and future demand without dropping existing connections and violating the interference and capacity constraints. The weights given to outages and missed new opportunities depend on the business policy. A collection of such Node B plans have been evaluated in the simulation test bed constructed, using the preferred reactive polices.

One embodiment of the RRA local planning layer uses genetic algorithms and genetic programming techniques to construct coherent plans. However, other well-known techniques (such as case based reasoning, market based approaches, neural networks, and hybrid approaches linking the former with hill climbing methods) are candidates for faster run time implementations.

It will be appreciated that the arrangement above is not intended to restrict the scope of the invention. For example, the embodiment described is concerned with the use of mobile telephones, but the invention can be applied to, for example, fixed wireless networks. Although the implementation has been described with reference to agent technology, any form of dynamic distributed co-operative control of the smart antenna can be used to optimise the coverage of a network.

The invention claimed is:

1. A method of controlling radio resources in a cellular wireless network comprising a plurality of fixed antennas providing overlapping radio coverage, the method comprising:

each of plural base stations with respective fixed antennas dynamically adjusting the shape of the radiation patterns pattern footprint of the respective fixed antenna antennas using distributed co-operative control, wherein the distributed co-operative control includes each base station adjusting the radiation pattern footprint of the respective fixed antenna in response to a negotiation between the plural base stations based on overall loading of the plural antennas taking into account surrounding base station traffic loadings and antenna physical constraints, in the negotiation each base station conducting a bi-directional information exchange process with adjacent base stations to co-operatively arrive at an adjusted radiation pattern footprint for each base station optimizing the overlapping radio coverage.

2. A method as claimed in claim 1, further comprising using agent technology to provide a negotiation process and the distributed cooperative control to co-ordinate the radiation patterns of the antennas, wherein the bi-directional information exchange comprises an over-capacity condition of a first cell (11) being communicated by a first base station to plural second base stations (12, 13, 14, 15, 16, 17) and subsequent offers to assume coverage of a respective part of the first cell are communicated to the first base station by each of the plural second station, the negotiation resulting in the adjusted radiation pattern footprint of the first base station being reduced in size and the respective adjusted radiation pattern footprints of the second base stations each being increased in size to collectively cover the reduction in size of the first base station radiation pattern footprint.

3. A method as claimed in claim 1, wherein agent technology is used to control the antennas to dynamically optimize the radio coverage of each fixed antenna forming the network to maximize the capacity of the network, wherein the negotiation produces a antenna pattern control, in response to a failed pattern footprint of a failed cell, to have first base stations of first adjacent cells adjust their respective pattern footprints to cover the failed pattern footprint of the failed cell, the first base stations adjusting to cover the failed pattern also off-loading a part of their capacity to second base stations of second adjacent cells, the second base stations of the second adjacent cells adjusting their respective pattern footprints to cover the off-loaded capacity of the first adjacent base stations.

4. A method as claimed in claim 1, wherein agent technology is used to control channel assignment and handovers between cells.

5. A method as claimed in claim 4, wherein the agent technology uses negotiating agents comprising a control unit, the control unit comprising a reactive layer for managing radio coverage within a cell and a local planning layer for optimizing radio coverage within one or more cells in response to local changes which can be predicted in advance or are unexpected.

6. A method as claimed in claim 5, wherein the local planning layer uses genetic algorithms to construct coherent plans for optimising the radio coverage.

7. A method as claimed in claim 5, wherein the control unit further comprises a co-operative layer for negotiation with other agents over a wider region of the radio network.

8. A method as claimed in claim 1, wherein the determination of radiation pattern shapes includes an input based on the predicted traffic demand within a group of cells.

9. A method as claimed in claim 1, wherein the wireless network is a wireless local loop network.

10. A method of controlling radio resources in a cellular wireless network comprising a plurality of base stations with respective fixed antennas providing overlapping radio coverage, the method comprising using artificial intelligence techniques to control the shape of the radiation pattern footprints patterns of the fixed antennas in a Code Division Multiple Access (CDMA) system, wherein the control of the shape of the radiation pattern footprints patterns applies to all frequencies and time slots used within a cell or sector of the network, wherein each base station adjusts the radiation pattern footprint of the respective fixed antenna in response to a negotiation between the plural base stations based on overall loading of the plural antennas taking into account surrounding base station traffic loadings and antenna physical constraints, in the negotiation each base station conducting a bi-directional information exchange process with adjacent base station to co-operatively arrive at an adjusted radiation pattern footprint for each base station optimizing the overlapping radio coverage.

11. A method as claimed in claim 10, wherein the wireless network is a Code Division Multiple Access (CDMA) cellular mobile network or part thereof comprising a plurality of cells, each cell having a base station comprising an antenna, the method further comprising determining the concentration of mobile stations in each cell and changing the radiation pattern shape, in both transmit and receive, of the antennas of some or all of the base stations in a co-ordinated way in response to the concentration of mobile stations in each cell, said determination comprising:
  i) a first base station soliciting offers from plural second adjacent base stations for the second base stations to move the respective radiation pattern footprints of the second base stations to additionally cover a part of the radiation pattern footprint of the first base station, and
  ii) in response to the offers solicitation of the first base station, the second base stations making bids to extend the respective radiation pattern footprints of the second base stations into the radiation pattern footprint of the first base station, the bids being made after the second base stations soliciting offers from plural third adjacent base stations for the third base stations to move the respective radiation pattern footprints of the third base stations to additionally cover a part of the respective radiation pattern footprints of the second base stations, and the second base stations receiving offers from the third base stations for the third base stations to extend the respective radiation pattern footprints of the third base stations into the respective radiation pattern footprints of the respective second base stations.

12. A method of controlling a cellular wireless network comprising plural base stations, each base station comprising a fixed antenna having a dynamically variable radiation pattern shape, the method comprising co-ordinating the radiation pattern shapes of the fixed antennas using distributed co-operative control, wherein the co-coordinating of the radiation pattern shapes involves each base station adjusting the radiation pattern footprint of the respective fixed antenna in response to a negotiation between the plural base stations based on overall loading of the plural antennas taking into account surrounding base station traffic loadings and antenna physical constraints, in the negotiation each base station conducting a bi-directional information exchange process with adjacent base station to co-operatively arrive at an adjusted radiation pattern footprint for each base station optimizing the overlapping radio coverage, wherein said negotiation occurs in each of plural adjacent time slots used within the network.

13. A method of optimising the allocation of radio resources in a mobile telephone network, comprising tracking changes in demand by mobile subscribers and co-ordinating the radiation pattern shapes of smart fixed antennas at plural base stations in the network using distributed co-operative control, wherein each base station adjusts the radiation pattern footprint of the respective fixed antenna in response to a negotiation between the plural base stations based on overall loading of the plural antennas taking into account surrounding base station traffic loadings and antenna physical constraints, in the negotiation each base station conducting a bi-directional information exchange process with adjacent base stations to co-operatively arrive at an adjusted radiation pattern footprint for each base station optimizing the overlapping radio coverage.

14. A method of co-ordinating the radiation pattern shapes of smart fixed antennas within a wireless network, comprising using hybrid agent architecture to support negotiation between plural Code Division Multiple Access (CDMA) base stations within the network by shaping the radiation pattern of the fixed antennas, wherein each base station adjusts the radiation pattern footprint of the respective fixed antenna in response to a negotiation between the plural base stations based on overall loading of the plural antennas taking into account surrounding base station traffic loadings and antenna physical constraints, in the negotiation each base station conducting a bi-directional information exchange process with adjacent base stations to co-operatively arrive at an adjusted radiation pattern footprint for each base station optimizing the overlapping radio coverage wherein the shaping of the radiation pattern applies to all frequencies and time slots used within a cell or sector of the network.

15. A wireless network comprising plural base stations having smart fixed antennas, wherein the radiation pattern shapes of the smart fixed antennas are dynamically adaptable under distributed co-operative control to satisfy variations in traffic demand within a whole wireless network or sub network whilst maintaining full mobile coverage within the said network, wherein each base station adjusts the radiation pattern footprint of the respective fixed antenna in response to a negotiation between the plural base stations based on overall loading of the plural antennas taking into account surrounding base station traffic loadings and antenna physical constraints, in the negotiation each base station conducting a bi-directional information exchange process with adjacent base stations to co-operatively arrive at an adjusted radiation pattern footprint for each base station optimizing the overlapping radio coverage.

16. The method as claimed in claim 1, wherein the distributed co-operative control determines the radiation patterns of the antennas by negotiations between base stations and without negotiations with any central control unit.

17. The method as claimed in claim 1, wherein the distributed co-operative control determines the radiation patterns of the antennas in response to variations in demand across the network by negotiations between base stations and without any intervention of a central control system.

* * * * *